US009348549B2

(12) United States Patent
Kim (10) Patent No.: US 9,348,549 B2
(45) Date of Patent: May 24, 2016

(54) IMAGE FORMING APPARATUS, SERVER APPARATUS, AND METHOD OF CONTROLLING PRINTING OF SERVER APPARATUS

(71) Applicant: SAMSUNG ELECTRONICS CO., LTD., Suwon-si (KR)

(72) Inventor: Su-dong Kim, Suwon-si (KR)

(73) Assignee: SAMSUNG ELECTRONICS CO., LTD., Suwon-Si (KR)

(*) Notice: Subject to any disclaimer, the term of this patent is extended or adjusted under 35 U.S.C. 154(b) by 0 days.

(21) Appl. No.: 14/264,530

(22) Filed: Apr. 29, 2014

(65) Prior Publication Data

US 2015/0022851 A1    Jan. 22, 2015

(30) Foreign Application Priority Data

Jul. 16, 2013  (KR) ........................ 10-2013-0083439

(51) Int. Cl.
*G06F 3/12* (2006.01)

(52) U.S. Cl.
CPC .............. *G06F 3/1286* (2013.01); *G06F 3/121* (2013.01); *G06F 3/1203* (2013.01); *G06F 3/1224* (2013.01); *G06F 3/1234* (2013.01); *G06F 3/1261* (2013.01); *G06F 3/1288* (2013.01); *G06F 3/1238* (2013.01); *G06F 3/1267* (2013.01)

(58) Field of Classification Search
USPC .............. 358/1.14, 1.15, 1.16, 1.17; 709/223, 709/224; 714/46, 57
See application file for complete search history.

(56) References Cited

U.S. PATENT DOCUMENTS

| 5,287,194 | A  | * | 2/1994 | Lobiondo | .......... G03G 15/5083 |
| | | | | | 358/1.15 |
| 6,970,923 | B1 | * | 11/2005 | Mukaiyama et al. | ......... 709/223 |
| 7,383,474 | B2 | * | 6/2008 | Sekizawa | ........................ 714/57 |
| 7,719,703 | B2 | * | 5/2010 | Kurotsu | ................ G06F 3/1212 |
| | | | | | 358/1.14 |
| 8,989,384 | B2 | * | 3/2015 | Ogura et al. | .................. 380/277 |
| 2005/0018242 | A1 | * | 1/2005 | Azami | ............... H04N 1/00204 |
| | | | | | 358/1.15 |
| 2007/0035763 | A1 | | 2/2007 | Bard et al. | |
| 2010/0037286 | A1 | | 2/2010 | Cain | |
| 2012/0327459 | A1 | * | 12/2012 | Huster | ........................ 358/1.15 |
| 2013/0163037 | A1 | * | 6/2013 | Huster | ................. G06F 3/1205 |
| | | | | | 358/1.15 |

OTHER PUBLICATIONS

Extended European Search Report (issuance date: Nov. 10, 2014) issued by the European Patent Office for European Patent Application No. 14176017.3.

* cited by examiner

*Primary Examiner* — Allen H Nguyen
(74) *Attorney, Agent, or Firm* — Staas & Halsey LLP

(57) ABSTRACT

A method of controlling printing of a server apparatus is provided. The method includes: receiving printing data, receiving error information from at least one image forming apparatus; determining an error state level corresponding to the error information among a plurality of error state levels; and when the determined error state level is an allowed level to print, transmitting the printing data to the image forming apparatus and deleting the stored printing data, and when the error state level is a disallowed level, not transmitting the printing data.

15 Claims, 11 Drawing Sheets

| ERROR INFORMATION | ERROR INFORMATION LEVEL |
|---|---|
| REPLACEMENT OPC NEEDED | Severe |
| THERE IS NO RESIDUAL AMOUNT OF TONER. | Severe |
| TONER IS NEARLY EMPTY | Warning |
| DEVELOPER IS ALMOST USED. | Warning |
| THERE ARE NO PAPER SHEETS IN PAPER CASSETTE. | information |

NOTIFICATION

PLEASE, PERFORM OUTPUTTING IN FOLLOWING MULTIFUNCTION PERIPHERAL THAT IS IN NORMAL STATE

| IP | MODEL NAME | LOCATION |
|---|---|---|
| 10.88.188.12 | CLX-9201 | IN FRONT OF ENTRANCE DOOR OF PLANNING TEAM ON 18TH FLOOR |
| 10.88.188.56 | CLX-9252 | BESIDE WINDOW OF FIRST SALES TEAM ON 18TH FLOOR |
| 10.88.188.32 | SCX-8030 | IN FRONT OF ENTRANCE DOOR OF SECOND SALES TEAM ON 18TH FLOOR |
| 10.88.189.17 | SCX-8040 | IN MIDDLE OF MARKETING TEAM ON 19TH FLOOR |
| 10.88.189.76 | CLX-9352 | BESIDE WINDOW OF DEVELOPMENT TEAM ON 19TH FLOOR |

[CLOSE]

| JOB NAME | SUBMIT |
|---|---|
| Microsoft Word-PS 2.0-사용설명서.docx | 01-08-2013 17:01:28 |
| Microsoft word-PSS 2.0-사용설명서.docx | 01-08-2013 16:58:19 |
| | |
| | | minae.oh : STORE2, SELECT 0

LOGOUT

THE NUMBER OF COPIES: ◁ 1 ▷

☐ STORE AFTER OUTPUT

UPDATE
DETAILED INFORMATION
DELETE ALL
PRINT ALL
CLOSE

IMAGE FORMING APPARATUS, SERVER APPARATUS, AND METHOD OF CONTROLLING PRINTING OF SERVER APPARATUS

CROSS-REFERENCE TO RELATED APPLICATIONS

This application claims priority benefit from Korean Patent Application No. 10-2013-0083439, filed on Jul. 16, 2013, in the Korean Intellectual Property Office, the disclosure of which is incorporated herein by reference in its entirety.

BACKGROUND

1. Field

The following description relates to providing an image forming apparatus, a server apparatus, and a method of controlling printing of the server apparatus, and more particularly, to providing an image forming apparatus that in a pull printing system, receives error information thereof, determines whether to transmit printing data according to an error state level corresponding to the error information and whether to delete the printing data from a server apparatus, and provides a guide message according to the determination, the server apparatus, and a method of controlling printing of the server apparatus.

2. Description of the Related Art

A pull printing system refers to a system where printing data is transmitted from a host apparatus to a server apparatus and the transmitted printing data is transmitted from the server apparatus to any image forming apparatus in order to output the printing data.

For example, in the pull printing system, if the user inputs user information in the image forming apparatus, a printing data job list corresponding to the user information among printing data pre-stored in the server apparatus is received, and if the user selects one of the printing data, the selected printing data is printed.

The server apparatus transmits printing data to the image forming apparatus according to a request of the user and then deletes the transmitted printing data from the server apparatus. Here, if the image forming apparatus succeeds in completing a printing job, this is not a problem. However, if the image forming apparatus is not a printable state, the printing data is deleted from the server apparatus, and a desired output is not acquired.

For example, if the user does not recognize that printing is impossible due to lack of a residual amount of toner of an image forming apparatus selected by the user and inputs a printing data output command into the corresponding image forming apparatus, the corresponding printing data is deleted data from the server apparatus, and the user does not acquire a desired output.

Here, the user goes back to the host apparatus to transmit the printing data to the server apparatus and then moves to another image forming apparatus connected to the server apparatus in order to input a printing command.

Therefore, there is a need for a printing controlling method of transmitting printing data to an image forming apparatus and checking a state of the image forming apparatus before deleting the printing data from a server apparatus to determine whether to transmit the printing data and whether to delete the printing data from the server apparatus.

SUMMARY

Exemplary embodiments address at least the above problems and/or disadvantages and other disadvantages not described above. Also, the exemplary embodiments are not required to overcome the disadvantages described above, and an exemplary embodiment may not overcome any of the problems described above.

An exemplary embodiments provide a server apparatus that determines an error state level according to error information of an image forming apparatus and determines whether to transmit printing data and whether to delete the printing data according to the determined error state level, a method of controlling printing of the server apparatus, and an image forming apparatus that provides a guide message according to an error state level.

According to an aspect of the exemplary embodiments, there is provided a method of controlling printing of a server apparatus. The method may include: receiving printing data from a host apparatus and storing the printing data; when at least one image forming apparatus to print the printing data, receiving error information from the image forming apparatus; determining an error state level corresponding to the error information among a plurality of error state levels; and when the determined error state level is an allowed level of the plurality of error state levels, transmitting the printing data to the image forming apparatus and/or deleting the stored printing data, and when the error state level is a disallowed level, not transmitting the printing data.

The method may further include: receiving user information input from the image forming apparatus. The printing data that is transmitted to the image forming apparatus may be one of stored printing data corresponding to the user information.

The transmitting of the printing data may include: when the error state level is the allowed level, transmitting a job list of printing data, which corresponds to the user information among the stored printing data, to the image forming apparatus; and when at least one printing data is selected from the job list, transmitting selected printing data to the image forming apparatus.

The method may further include: when the error state level is the disallowed level, transmitting a list of image forming apparatuses available to print, to the image forming apparatus.

The plurality of error state levels may include a first level which indicates a lack state of paper sheets, a second level which indicates that a replacement of a component of the image forming apparatus is needed, and a third level which indicates an unprintable state. The allowed level may be the first or second level, and the disallowed level may be the third level.

The method may further include: when the error state level is the second level, transmitting a guide message about a state of the image forming apparatus to the image forming apparatus.

The error state level corresponding to the error information may be changeable.

According to another aspect of exemplary embodiments, there is provided a server apparatus to be connected to a plurality of image forming apparatuses. The server apparatus may include: a storage unit to store printing data transmitted from a host apparatus; a communicator to receive error information from an image forming apparatus that is selected from the plurality of image forming apparatuses by a user; and a controller to determine an error state level corresponding to the error information among a plurality of preset error state levels. The controller may transmit the printing data to the image forming apparatus and delete the stored printing data when the determined error state level is an allowed level of the plurality of error state levels and may not transmit the printing data when the determined error state level is a disallowed level.

The communicator may receive user information input from the selected image forming apparatus, and the printing data transmitted to the selected image forming apparatus may be printing data corresponding to the user information among stored printing data.

The controller may control the communicator to generate a job list of printing data corresponding to the user information among the pre-stored printing data when the error state level is the allowed level and, when at least one printing data is selected from the job list, transmit the selected printing data to the selected image forming apparatus.

When the error state level is the disallowed level, the controller may generate a list of image forming apparatuses that perform printing.

The plurality of error state levels may include a first level which indicates a lack state of paper sheets, a second level which indicates that a replacement of a component is needed, and a third level which indicates an unprintable state. The allowed level may be the first or second level, and the disallowed level may be the third level.

When the error state level is the second level, the controller may generate a guide message about a state of the selected image forming apparatus or may change the error state level corresponding to the error information.

According to another aspect of exemplary embodiments, there is provided an image forming apparatus configured to receive printing data corresponding to user information from a server apparatus to perform a printing job. The image forming apparatus may include: an image former; a communicator to transmit the user information and error information of the image forming apparatus and receive the printing data according to an error state level corresponding to the error information; a display unit to display a guide message corresponding to the error state level; and a controller to control the image former to output the printing data received according to the error state level.

When the error state level is an allowed level, the display unit may display a job list of printing data corresponding to the user information.

When the error state level is a disallowed level, the display unit may display a list of image forming apparatuses that perform printing among image forming apparatuses connected to the server apparatus.

BRIEF DESCRIPTION OF THE DRAWINGS

The above and/or other aspects will be more apparent by describing certain exemplary embodiments with reference to the accompanying drawings, in which.

DETAILED DESCRIPTION

Exemplary embodiments are described in greater detail with reference to the accompanying drawings.

In the following description, the same drawing reference numerals are used for the same components even in different drawings. The matters defined in the description, such as detailed construction and components, are provided to assist in a comprehensive understanding of the exemplary embodiments. Thus, it is apparent that the exemplary embodiments may be carried out without those specifically defined matters. Also, well-known functions or constructions are not described in detail since they would obscure the exemplary embodiments with unnecessary detail.

Figure 1:
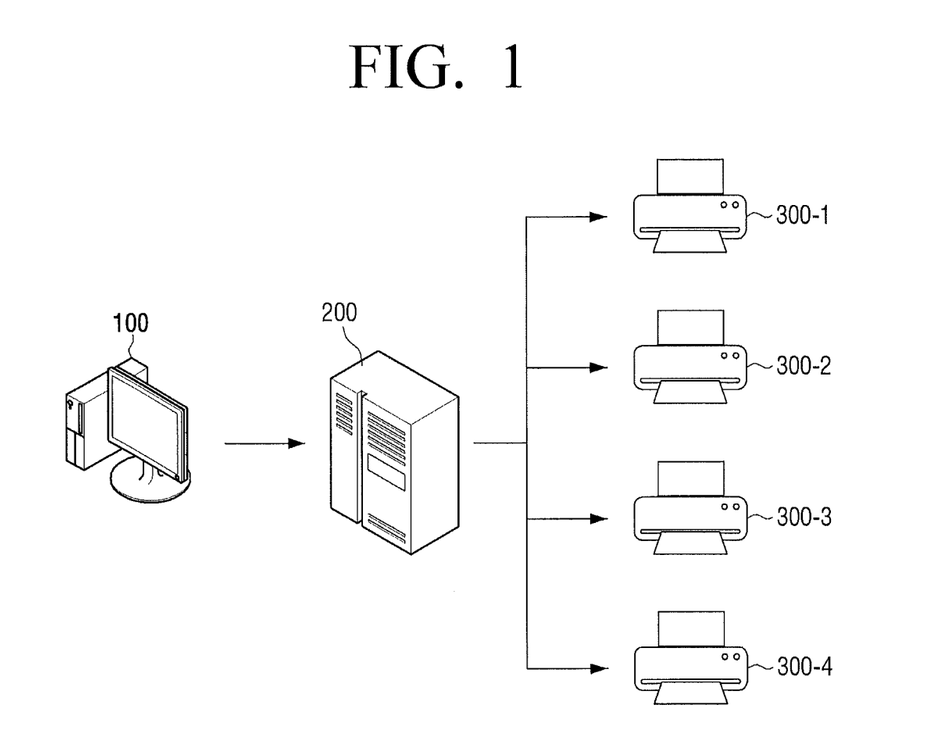
FIG. 1 is a view illustrating a pull printing system according to an exemplary embodiment of the present general inventive concept.

FIG. 1 is a view illustrating a pull printing system according to an exemplary embodiment of the present general inventive concept.

Referring to FIG. 1, the pull printing system includes a host apparatus 100, a server apparatus 200, and a plurality of image forming apparatuses 300-1, 300-2, 300-3, and 300-4.

As a non-limiting example, the pull printing system of FIG. 1 includes four image forming apparatuses 300-1, 300-2, 300-3, and 300-4 but may include the larger or smaller number of image forming apparatuses than the four image forming apparatuses 300-1, 300-2, 300-3, and 300-4.

A user transmits printing data from the host apparatus 100 to the server apparatus 200. The server apparatus 200 stores the printing data.

The server apparatus 200 is connected to the plurality of image forming apparatuses 300-1, 300-2, 300-3, and 300-4, and the user selects one of the plurality of image forming apparatuses 300-1, 300-2, 300-3, and 300-4 connected to the server apparatus 200 to input a printing command.

Here, if the user transmits information about the user to the server apparatus 200 by using a method of inputting an identification (ID) of the user into one of the image forming apparatuses 300-1, 300-2, 300-3, and 300-4 or the like, the server apparatus 100 transmits printing data, which corresponds to the user information among a plurality of printing data pre-stored in the server apparatus 100, to the corresponding image forming apparatus.

In the pull printing system, an output may be acquired from one of the plurality of image forming apparatuses 300-1, 300-2, 300-3, and 300-4 selected by the user.

Figure 2:
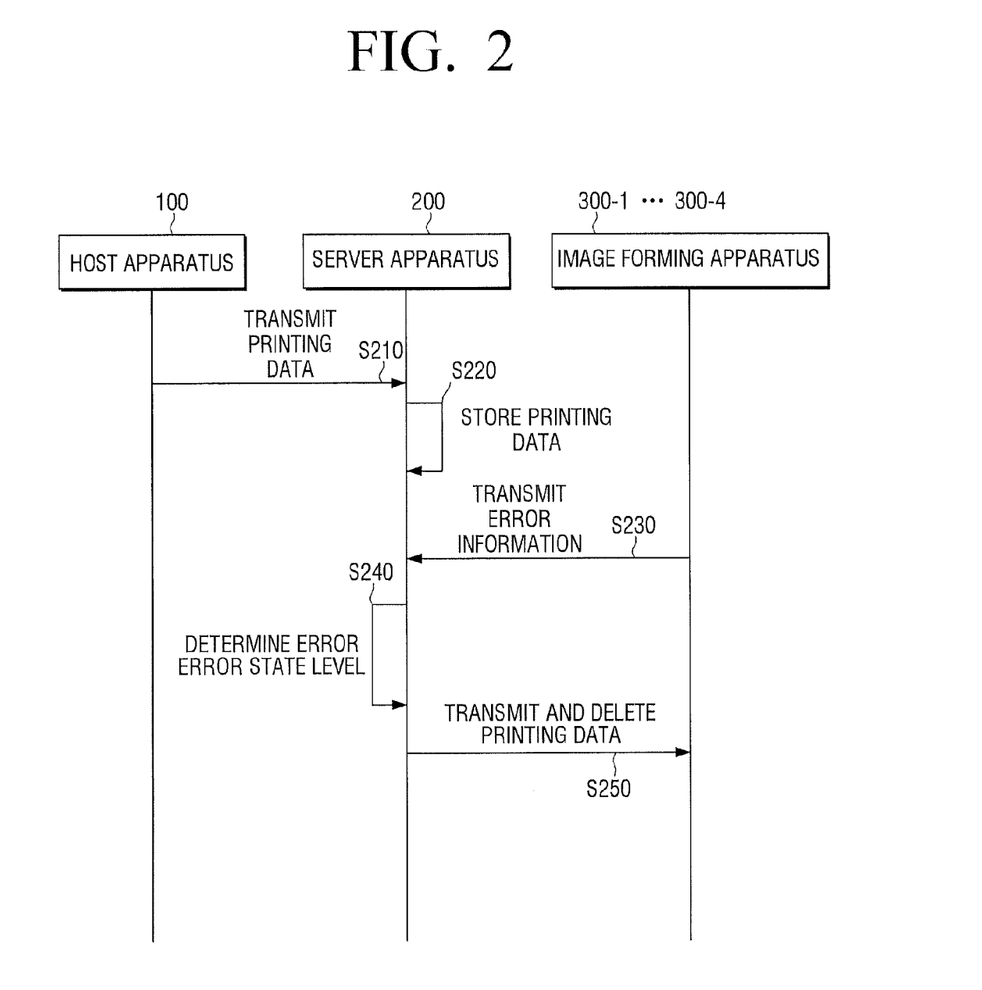
FIG. 2 is a timing diagram illustrating a pull printing system in detail according to an exemplary embodiment of the present general inventive concept.

FIG. 2 is a timing diagram illustrating a pull printing system in detail according to an exemplary embodiment of the present general inventive concept.

In operation S210, a user transmits printing data that the user wants to output from the host apparatus 100, to the server apparatus 200. In operation S220, the server apparatus 200 stores the printing data.

If the user selects one of the plurality of image forming apparatuses 300-1, 300-2, 300-3, and 300-4 connected to the server apparatus 200 to input a printing command into the corresponding image forming apparatus, the selected image forming apparatus transmits user information and error information of the image forming apparatus selected by the user to the server apparatus 200 in operation S230.

In operation S240, the server apparatus 200 compares the error information of the image forming apparatus with an error state level corresponding to preset error information to determine an error state level of the image forming apparatus selected by the user.

In operation S250, if the error state level of the image forming apparatus is a preset allowed level, the server apparatus 200 transmits the printing data to the image forming apparatus and deletes the transmitted printing data from the server apparatus 200.

In the present exemplary embodiment, the error state level of the image forming apparatus is described as the preset allowed level. However, if the error state level of the image forming apparatus is a disallowed level, the printing data may not be transmitted.

For example, the server apparatus 200 may classify the error state level of the image forming apparatus into three levels, i.e., "severe", "warning", and "information" levels. Although, as a non-limiting example, only three levels are shown, one or more error state levels may be used to classify the error state levels thereinto.

The "severe" level refers to a current state of the image forming apparatus that may not perform a printing job. For example, a state in which an Organic Photo Conductor (OPC) is no longer of any use or there is no residual amount of toner may correspond to the "severe" level The "warning" level refers that if a step is not taken now, the image forming apparatus may shortly reach a state where the image forming apparatus may not perform a printing job. For example, a state where a residual amount of toner is smaller than or equal to a preset reference or a replacement of a developer is needed may correspond to the "warning" state The "information" level refers that the image forming apparatus may not currently perform a printing job but may keep printing through a simple step of the user. For example, a state where paper sheets lack in a paper cassette or a paper sheet is jammed may correspond to the "information" level.

The "warning" and "information" levels may be preset allowed levels. The "warning" and "information" levels refers to states where a printing job may be performed. Therefore, if it is determined that the error state level of the image forming apparatus selected by the user is the "warning" or "information" level, the server apparatus 200 transmits the printing data to the image forming apparatus and deletes the printing data therefrom.

The "severe" level may correspond to a preset disallowed level. "Severe" The "severe" level refers to state where the printing job may not be performed. Therefore, if it is determined that the error state level of the image forming apparatus selected by the user is the "severe" level, the server apparatus 200 does not transmit the printing data to the image forming apparatus.

Figure 3:
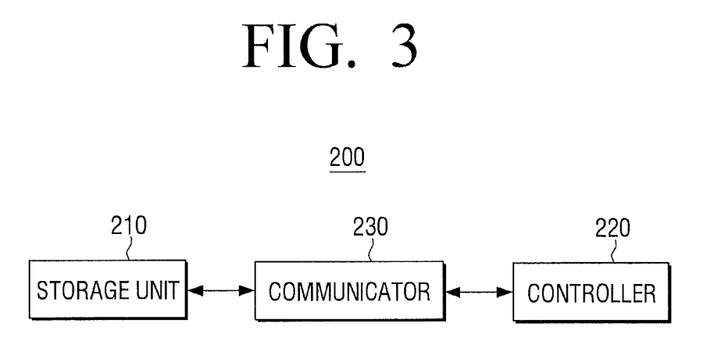
FIG. 3 is a block diagram illustrating a server apparatus of a pull printing system, according to an exemplary embodiment of the present general inventive concept.

FIG. 3 is a block diagram illustrating the server apparatus 200 of the pull printing system, according to an exemplary embodiment of the present general inventive concept.

Referring to FIG. 3, the server apparatus 200 includes a storage unit 210, a communicator 220, and a controller 230.

Only components of the server apparatus 200 related to the present exemplary embodiment are illustrated in FIG. 3. Therefore, those skilled in the art may further include other types of genera-purpose components besides the components of FIG. 3.

The storage unit 210 stores printing data transmitted from the host apparatus 100.

The storage unit 210 may storage a mapping table to determine an error state level according to error information.

The communicator 220 receives error information from one that is selected by the user from the plurality of image forming apparatuses 300-1, 300-2, 300-3, and 300-4 connected to the server apparatus 200. The communicator 220 may also receive user information that is input by the user, along with the error information.

Here, if it is determined that the image forming apparatus is in a state where it may not perform a printing job, printing data, which corresponds to the user information among pre-stored in the storage unit 210, may not be transmitted to the image forming apparatus.

If an error state level of the image forming apparatus is a preset allowed level of a plurality of error state levels, the controller 230 transmits printing data to the image forming apparatus selected by the user and deletes the printing data from the storage unit 210. If the error state level of the selected image forming apparatus is a disallowed level, the controller 230 does not transmit the printing data to the selected image forming apparatus.

For example, the error state level may be classified into three levels, i.e., "severe", "warning", and "information" levels "The "severe" level refers that the image forming apparatus is currently in a state where the image forming apparatus may not perform a printing job. For example, a state where a replacement of an OPC is needed or there is no residual amount of toner may correspond to the "severe" level The "warning" level refers that if a step is not taken now, the image forming apparatus may shortly reach a state where the image forming apparatus may not perform the printing job. For example, a state where a residual amount of tonner is smaller than or equal to a preset reference or a developer is about to die may also correspond to the "warning" level The "information" level refers to a state that the image forming apparatus may not perform a printing job but keep printing through a simple step taken by the user. For example, a state that paper sheets lack in a paper cassette or a paper sheet is jammed may correspond to the "information" level.

Here, if error information of the image forming apparatus is the "warning" or "information" level, the image forming apparatus may perform the printing job, and thus the error information corresponds to an allowed level. If the error information is the "severe" level, the image forming apparatus may not perform the printing job, and thus the error information corresponds to a disallowed level.

If the error state level of the image forming apparatus is an allowed level, the controller 230 generates a job list of printing data corresponding to user information among pre-stored in the storage unit 210 and transmits the job list to the image forming apparatus selected by the user.

If a printing command is input for one of a plurality of printing data included in the job list is input, the selected printing data is transmitted to the image forming apparatus selected by the user through the communicator 220 and then output.

However, if the error state level of the image forming apparatus is the "warning" level, the printing job may not be completed. Therefore, the controller 230 may generate and transmit a guide message that the printing job may not be completed in the image forming apparatus selected by the user.

If the error state level of the image forming apparatus is a disallowed level, the controller 230 generates a list of image forming apparatuses that may perform printing jobs among the plurality of image forming apparatuses 300-1, 300-2, 300-3, and 300-4 connected to the server apparatus 200 and transmits the list to the image forming apparatus selected by the user.

Here, since printing data is not transmitted to the image forming apparatus selected by the user, the printing data is not deleted from the storage unit 210. Also, if the user receives printing data from another image forming apparatus to complete a printing job, the printing data is deleted at last.

As described above, the server apparatus 200 determines whether to transmit printing data and whether to delete the printing data according to the error state level of the image forming apparatus. Therefore, although the user does not acquire an output, the server apparatus 200 may prevent the printing data from being deleted from the server apparatus 200.

The server apparatus 200 may pre-store error state level information corresponding to error information to receive error information from the image forming apparatus selected by the user in order to determine an error state level of the image forming apparatus.

Figure 4:
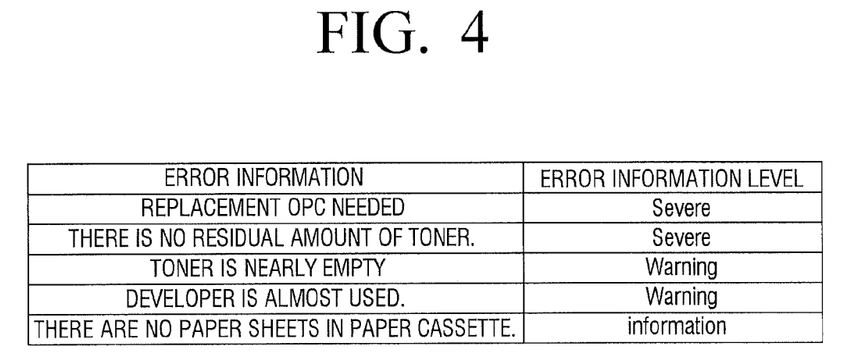
FIG. 4 is a view illustrating a mapping table to determine an error state level corresponding to error information according to an exemplary embodiment of the present general inventive concept.

FIG. 4 is a view illustrating a mapping table to determine an error state level corresponding to error information according to an exemplary embodiment of the present general inventive concept.

In FIG. 4, as a non-limiting example, the error information includes only a life expectancy of an OPC, a residual amount of toner, a state of a developer, and the number of paper sheets remaining in a paper cassette, however, the error information may further include any other error information in a process of realizing the present general inventive concept. For example, the error information may be any information related to an operational state of an image forming apparatus.

Also, although as a non-limiting example, an error state level is classified into three levels, i.e., "severe", "warning", and "information" levels but the error state level may include one or more levels which the one or more levels may be further subdivided.

The mapping table to determine the error state level is pre-stored in the storage unit 210 of the server apparatus 200.

For example, if an error information code "there is no paper sheet in a paper cassette." is transmitted from the image forming apparatus selected by the user, the controller 230 of the server apparatus 200 compares transmitted error information code with the mapping table to determine that the corresponding error information is the "information" level.

Alternatively, if the error information code corresponds to a code "there is no residual amount of toner.", the controller 230 may determine that the error state level of the image forming apparatus is the "severe" level.

A user or an operator of the server apparatus 200 may change, modify, or customize an error state level of each error information.

For example, in the present exemplary embodiment, "Paper sheets lack." corresponds to the "information" level. However, the manager of the server apparatus 200 may change "Paper sheets lack." to the "warning" level.

Therefore, the server apparatus 200 may transmit printing data and a guide message that the printing data may not be completely printed in the image forming apparatus selected by the user, to the image forming apparatus selected by the user.

Figure 5:
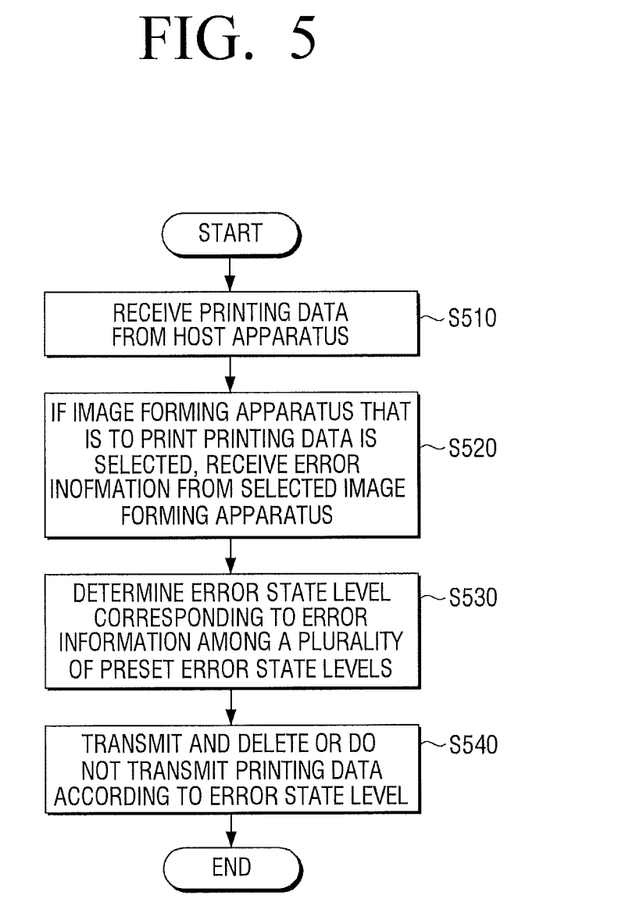
FIG. 5 is a flowchart illustrating a method of controlling printing of a server apparatus according to an exemplary embodiment of the present general inventive concept.

FIG. 5 is a flowchart illustrating a method of controlling printing of the server apparatus 200, according to an exemplary embodiment of the present general inventive concept.

If a user transmits printing data that the user wants to print, from the host apparatus 100 to the server apparatus 200, the storage unit 210 of the server apparatus 200 stores the printing data in operation S510.

If the user selects one of the plurality of image forming apparatuses 300-1, 300-2, 300-3, and 300-4 connected to the server apparatus 200 to input a printing command, the server apparatus 200 receives error information of the image forming apparatus selected by the user in operation S520.

In operation S530, the server apparatus 200 determines that the error information transmitted from the image forming apparatus corresponds to which one of a plurality of error state levels, by using a pre-stored mapping table.

In operation S540, the server apparatus 200 transmits the printing data to the image forming apparatus selected by the user and deletes the transmitted printing data from the server apparatus 200 if the error state level of the image forming apparatus selected by the user is a preset allowed level, but does not transmit or delete the printing data if the error state level is a disallowed level.

Therefore, although the user does not acquire an output, an effect of preventing the printing data from being deleted from the server apparatus 200 may be achieved.

Figure 6:
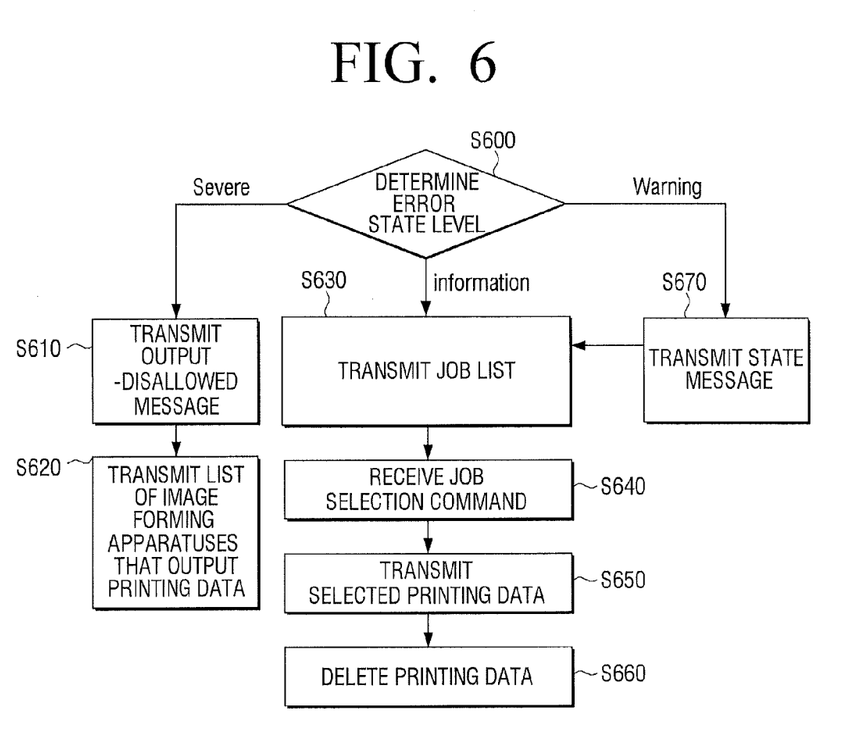
FIG. 6 is a flowchart illustrating a process of performing operations according to error state levels of an image forming apparatus according to an exemplary embodiment of the present general inventive concept.

FIG. 6 is a flowchart illustrating a process of performing operations according to error state levels of an image forming apparatus, according to an exemplary embodiment of the present general inventive concept.

In the present exemplary embodiment, a process of transmitting printing data from the host apparatus 100 to the server apparatus 200 and receiving error information from the image forming apparatus selected by the user is the same as that described with reference to FIG. 5, and thus its repeated description is omitted.

Also, in the present exemplary embodiment, an error state level will be described as being classified into three levels, i.e., "severe", "warning", and "information" levels.

If it is determined that the error state level of the image forming apparatus selected by the user is a disallowed level, i.e., the "severe" level, the server apparatus 200 transmits an output-disallowed message in operation S610, and generates and transmits a list of image forming apparatuses that may perform printing jobs among the plurality of image forming apparatuses 300-1, 300-2, 300-3, and 300-4 connected to the server apparatus 200 in operation S620.

In operation S600, the server apparatus 200 determines that the error information transmitted from the image forming apparatus corresponds to which one of a plurality of error state levels. If it is determined that the error state level of the image forming apparatus is the "information" level that is one of allowed levels, the server apparatus 200 generates and transmits a job list of printing data corresponding to user information in operation S630. If the user selects one printing job from the job list in operation S640, the server apparatus 200 transmits selected printing data to the image forming apparatus in operation S650 and deletes the printing job from the server apparatus 200 in operation S660.

If the error state level of the image forming apparatus is the "warning" level that is another allowed level, the error state level may be equal to the "information" level or a printing job may not be performed on printing data selected by the user. Therefore, the server apparatus 200 does not transmit a state message related to this in operation S670.

Figure 7:
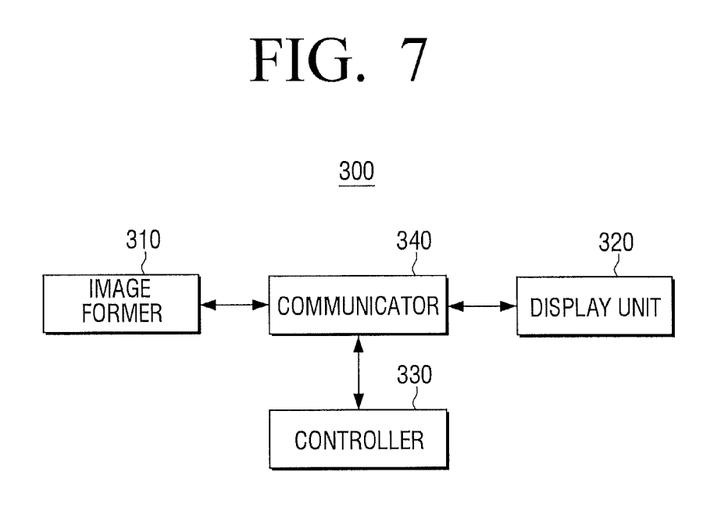
FIG. 7 is a block diagram illustrating an image forming apparatus according to an exemplary embodiment of the present general inventive concept.

FIG. 7 is a block diagram illustrating an image forming apparatus 300 according to an exemplary embodiment of the present general inventive concept.

Referring to FIG. 7, the image forming apparatus 300 includes an image former 310, a communicator 320, a display unit 330, and a controller 340.

Only components of the image forming apparatus 300 related to the present exemplary embodiment are illustrated in FIG. 7, but those skill in the art may further include other types of general-purpose components besides the components of FIG. 7.

The image former 310 performs a printing job on the received printing data.

The communicator 320 transmits user information and error information of the image forming apparatus 300 selected by the user and receives the printing data according to an error state level corresponding to the error information.

In detail, if the error state level of the image forming apparatus 300 is an allowed level, the communicator 320 receives the printing data from the server apparatus 200. If the error state level of the image forming apparatus 300 is a disallowed level, the communicator 320 does not receive the printing data.

The display unit 330 displays a guide message corresponding to the error state level. Alternatively, the display unit 330 may receive a job list of printing data corresponding to the user information from the server apparatus 200 and display the job list.

The controller 340 controls the image former 320 to output the printing data received according to the error state level.

In detail, the controller 340 controls the image former 310 to receive printing data and perform a printing job only if the error state of the image forming apparatus 300 is an allowed level.

FIGS. 8 through 11 are views illustrating various guide messages that are displayed on the display unit 330 of the image forming apparatus 300.

Figure 8:
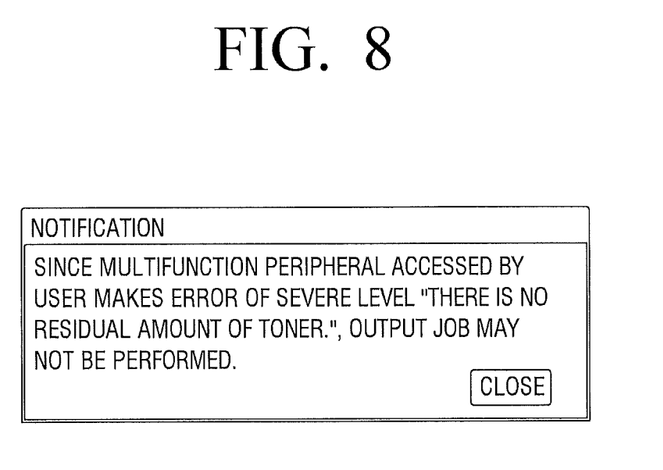
FIGS. 8, 9 10 and 11 are views illustrating various types of guide messages that are displayed on a display unit of an image forming apparatus.

FIG. 8 is a view illustrating a guide message that if the error state level of the image forming apparatus 300 is the "severe" level, a printing job may not be performed on printing data selected by the user, according to an exemplary embodiment of the present general inventive concept.

If the guide message is displayed on the display unit 330 of the image forming apparatus 300, the user may recognize that the user may not perform printing in the image forming apparatus 300 selected by the user and move to another image forming apparatus to input a printing command.

Figure 9:
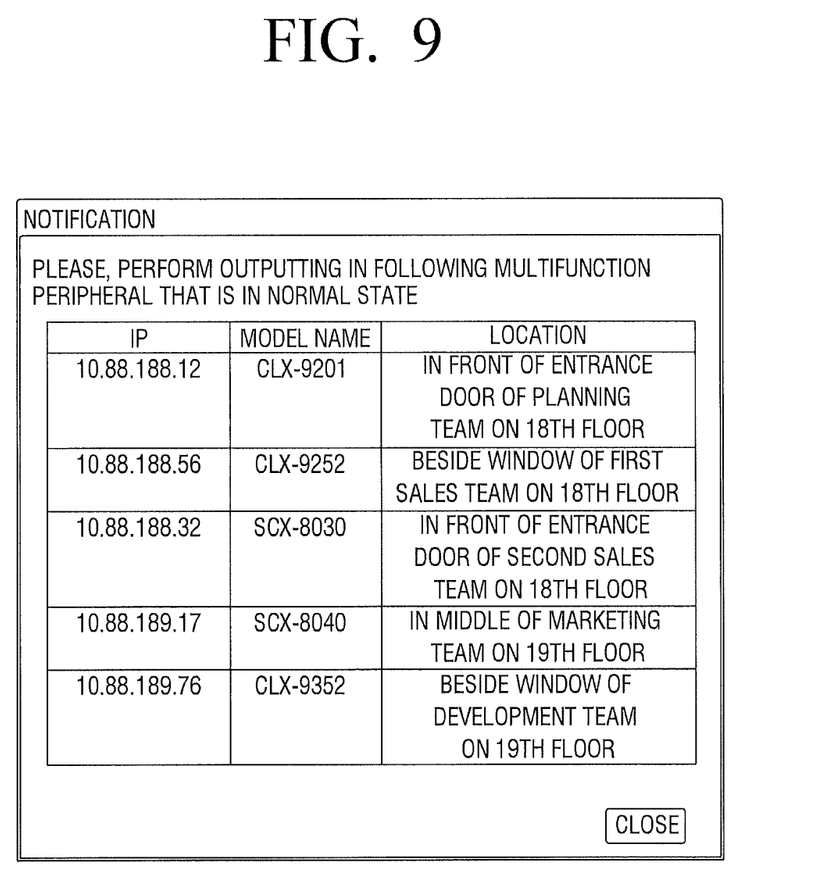

FIG. 9 is a view illustrating a guide message that there is an image forming apparatus that may perform printing among the plurality of image forming apparatuses 300-1, 300-2, 300-3, and 300-4 connected to the server apparatus 200, according to an exemplary embodiment of the present general inventive concept.

The user may check location information of an image forming apparatus that may perform a printing job, by using information displayed in the guide message and select to the corresponding image forming apparatus to input a printing command.

Figure 10:
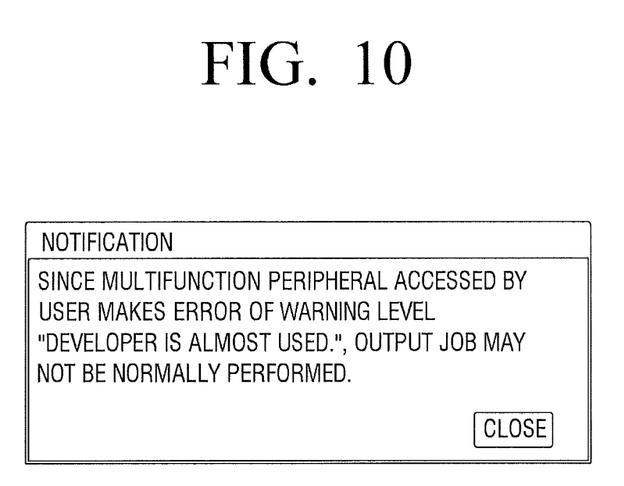

FIG. 10 is a view illustrating a guide message that an error state level of an image forming apparatus selected by the user is the "warning" level, according to an exemplary embodiment of the present general inventive concept.

If the error state level of the image forming apparatus is the "warning" level, a printing job may not be performed. Therefore, a guide message related to this may be displayed, and the user may determine whether to keep performing the printing job in the corresponding image forming apparatus.

Figure 11:
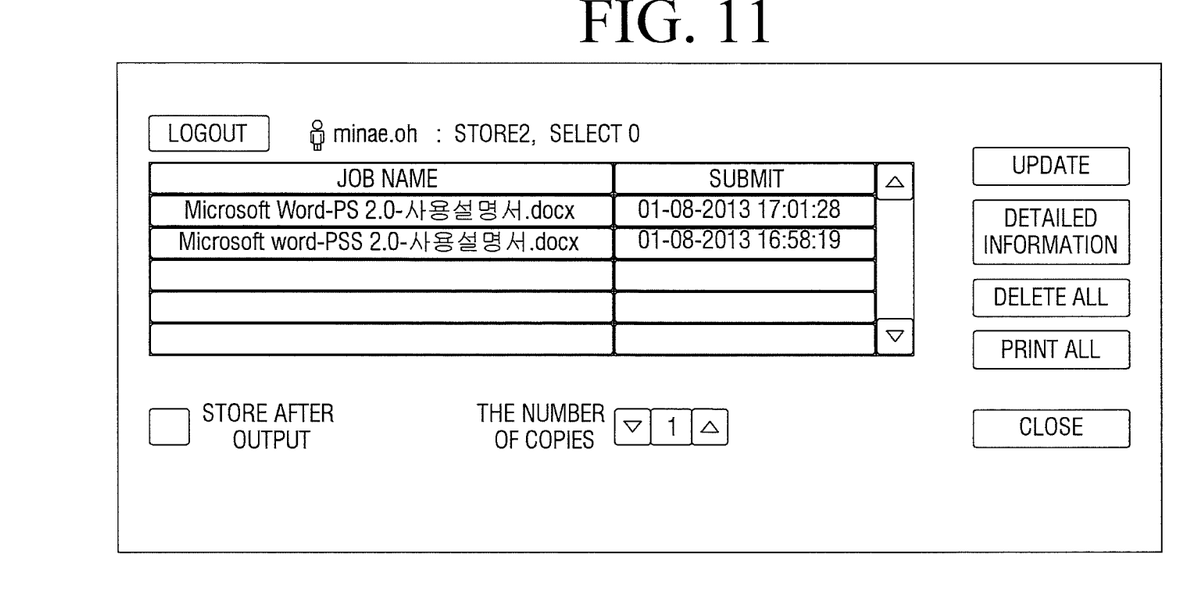

FIG. 11 is a view illustrating a printing job list according to an exemplary embodiment of the present general inventive concept.

If an error state level of an image forming apparatus selected by the user is an allowed level, the server apparatus 200 provides a job list of printing data corresponding to user information.

The user may select at least one printing data from the job list to input a printing command or acquire an output of the at least one printing data.

According to exemplary embodiments of the present general inventive concept as described above, a determination may be made as to whether to transmit printing data and whether to delete the printing data according to an error state level corresponding to error information of an image forming apparatus. Therefore, the printing data may be output from a normal image forming apparatus not to be deleted from a server apparatus according to a request of a user.

The above-described method may be written as a program that may be executed in a computer and may be realized in a general-purpose digital computer that executes the program by using a computer-readable recording medium. Further, the above-described embodiments may be recorded in non-transitory computer-readable media including program instructions to implement various operations embodied by a computer. The non-transitory computer readable medium may be a medium which does not store data temporarily such as a register, cash, and memory but stores data semi-permanently and is readable by electronic apparatuses. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD ROM disks, DVDs and Blu-rays; magneto-optical media such as optical discs; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

The foregoing exemplary embodiments and advantages are merely exemplary and are not to be construed as limiting. The present teaching may be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of controlling printing of a server apparatus, the method comprising:
receiving printing data, using a storage unit, from a host apparatus and storing the printing data;

in response to the receiving of the print data, automatically receiving error state information from at least one image forming apparatus using a communicator;

determining, using a controller, an error state level corresponding to the error information among a plurality of error state levels; and when the determined error state level is a preset allowed level of the plurality of error state levels, transmitting the printing data to the image forming apparatus and deleting the stored printing data, and when the error state level is a disallowed level, not transmitting the printing data.

2. The method of claim 1, further comprising:

receiving user information input from the at least one image forming apparatus, wherein the transmitting of the printing data includes transmitting a stored printing data corresponding to the user information.

3. The method of claim 2, wherein the transmitting of the printing data further includes:

when the error state level is the allowed level, transmitting a job list of printing data, which corresponds to the user information among the stored printing data, to the at least one image forming apparatus; and when at least one printing data is selected from the job list, transmitting selected printing data to the image forming apparatus.

4. The method of claim 3, further comprising:

when the error state level is the disallowed level, transmitting a list of other image forming apparatuses available to print, to the image forming apparatus.

5. The method of claim 4, wherein the plurality of error state levels includes a first level which indicates a lack state of paper sheets, a second level which indicates that a replacement of a component of the at least one image forming apparatus is needed, and a third level which indicates an unprintable state, wherein the allowed level is the first or second level, and the disallowed level is the third level.

6. The method of claim 5, further comprising:

when the error state level is the second level, transmitting a guide message about a state of the image forming apparatus to the image forming apparatus.

7. The method of claim 1, wherein the error state level corresponding to the error state information is changeable.

8. At least one non-transitory computer readable medium to store computer readable instruction to control at least one processor to implement the method of claim 1.

9. A server apparatus connected to at least one image forming apparatus, the server apparatus comprising:

a storage unit to store printing data transmitted from a host apparatus;

a communicator to, in response to the transmission of the printing data, automatically receive error state information from the at least one image forming apparatus; and a controller configured to determine an error state level corresponding to the error information among a plurality of preset error state levels, wherein the controller transmits the printing data to the image forming apparatus and deletes the stored printing data when the determined error state level is a preset allowed level of the plurality of error state levels, and does not transmit the printing data when the determined error state level is a disallowed level.

10. The server apparatus claim 9, wherein the communicator receives user information input from the at least one image forming apparatus, and the controller transmits the printing data corresponding to the user information among the stored printing data.

11. The server apparatus of claim 10, wherein the controller controls the communicator to generate a job list of printing data corresponding to the user information among the stored printing data when the error state level is the allowed level and, when at least one printing data is selected from the job list, transmit the selected printing data to the at least one image forming apparatus.

12. The server apparatus of claim 11, wherein when the error state level is the disallowed level, the controller generates a list of other image forming apparatuses available to print.

13. The server apparatus of claim 12, wherein the plurality of error state levels includes a first level which indicates a lack state of paper sheets, a second level which indicates that a replacement of a component of the at least one image forming apparatus is needed, and a third level which indicates an unprintable state, wherein the allowed level is the first or second level, and the disallowed level is the third level.

14. The server apparatus of claim 13, wherein when the error state level is the second level, the controller generates a guide message about a state of the selected image forming apparatus.

15. The server apparatus of claim 9, wherein the error state level corresponding to the error state information is changeable.

* * * * *